United States Patent [19]

Schulze

[11] Patent Number: 4,685,950
[45] Date of Patent: Aug. 11, 1987

[54] PROCESS FOR IMPROVING THE SURFACE FINISH OF GLASS FOILS

[75] Inventor: Hans-Wilhelm Schulze, Mainz, Fed. Rep. of Germany

[73] Assignee: Schott Glaswerke, Mainz, Fed. Rep. of Germany

[21] Appl. No.: 819,239

[22] Filed: Jan. 15, 1986

[30] Foreign Application Priority Data

Jan. 17, 1985 [DE] Fed. Rep. of Germany ....... 3501398

[51] Int. Cl.$^4$ .......................................... C03B 23/02
[52] U.S. Cl. .......................................... 65/106; 65/92; 65/104; 65/374.13; 65/DIG. 5
[58] Field of Search .................... 65/63, 92, 106, 102, 65/104, 111, 117, 374.13, DIG. 5; 264/2.7, 230, 291, 292

[56] References Cited

U.S. PATENT DOCUMENTS

| | | | |
|---|---|---|---|
| 2,897,546 | 8/1959 | Clapp et al. | 264/346 |
| 2,918,696 | 12/1959 | Bottoms et al. | 264/291 |
| 3,308,215 | 3/1967 | Last | 264/230 |
| 3,894,137 | 7/1975 | Moench | 264/230 |
| 4,278,723 | 7/1981 | Moench et al. | 264/291 |
| 4,591,373 | 5/1986 | Sato | 65/106 |

FOREIGN PATENT DOCUMENTS

| | | | |
|---|---|---|---|
| 1533237 | 11/1978 | United Kingdom | 264/230 |
| 585076 | 12/1977 | U.S.S.R. | 264/291 |

Primary Examiner—James Lowe
Attorney, Agent, or Firm—Barnes & Thornburg

[57] ABSTRACT

In a process for improving the smoothness of the surfaces of foils made from thermoplastics materials, particularly glass, the foil is stretched in two directions or dimensions. In a particular method, the foil is laid on top of a first frame and subsequently heated to a temperature which lies in a temperature range within which the foil starts to soften. A second frame which is at the same temperature as that of the foil is then placed on top of the foil so that the latter is effectively clamped between the frames. The two frames and foil is then cooled. The material chosen for the frames is one having a coefficient of thermal expansion smaller than or equal to that of the material of the foil.

19 Claims, 4 Drawing Figures

PROCESS FOR IMPROVING THE SURFACE FINISH OF GLASS FOILS

BACKGROUND OF THE INVENTION

This invention relates to a process for improving the surface finish of foils made from thermoplastic materials such as glass or plastics. Foils made from glass or plastics are subject to stringent specifications as regards the surface finish when, for example, such foils are to be utilized as backing materials.

THE PRIOR ART

It is possible to obtain smooth surfaces by a grinding and polishing process. However, this process has the disadvantage that the sheets of foil must be sufficiently thick. Furthermore, the surface to be machined is restricted in size or area.

Another known process involves pressing flat or profiling, in which the sheet of foil is pressed between tools having plane surfaces and is subjected simultaneously to a suitable temperature treatment. A foil profiled in that way nevertheless has surface faults, which adversely affect the strength of the foil. These surface faults can lead to failure of the foil when loaded mechanically. The surface can be damaged by the foil adhering to the tools, which will also reduce the strength. Experience has also shown that the smallest amounts of impurities (dust, among others) can lead to defects in the surface. The sheet of foil frequently also has a corrugated surface structure.

A process frequently used on glass sheets is the so-called fine etching process, wherein plain sheets, which are initially thick, are reduced to the desired thickness by a special etching process which strips the material. Foils manufactured in this way are also not exempt from unacceptable surface structures and in many cases have a heterogeneous thickness distribution. The loss of material is considerable, so that the process is quite expensive.

OBJECTS OF THE INVENTION

The object of the invention is, therefore, to provide a process in which the above mentioned disadvantages are avoided or at least substantially reduced, and in which foils are produced which have an improved surface finish. In practice, larger area foils can be processed and a greater homogeneity of thickness can be achieved together with significant improvements to surface finish.

STATEMENTS OF THE INVENTION

According to the invention there is provided a process for improving the surface finish of foils made from thermoplastic material, including the step of subjecting the foil to tension forces in two directions or dimensions.

Preferably, the process includes the steps of supporting the foil to be treated by engagement of the marginal regions thereof with a first frame such that the marginal regions of the foil are supported thereby; heating the foil and frame to a temperature which lies within a temperature range within which the foil commences to soften; using a second frame, which has been heated to the same temperature as the first frame and foil, such that the marginal regions of the foil are effectively sandwiched between the two frames, and then cooling the frames and the foil according to a predetermined cooling cycle or regime.

For better understanding of the invention, methods of putting the process of the invention into effect will be discussed in greater detail.

The first stage of the process of the invention involves supporting the marginal edge regions of the sheet or area of a foil to be processed, by a first frame which can define a rectangular, circular or other desired shape for the foil marginal edges. The frame and foil are then heated in a furnace to a predetermined temperature which lies in a temperature range within which the foil starts to become progressively softer. At this heating stage, care needs to be taken to ensure that the foil does not become too soft and thereby begins to sag relative to the plane of the frame. Since the marginal edge regions of the foil are only placed upon the first frame and not attached to the frame, the foil is able to expand freely during the heating process.

When the foil and first frame have been heated to the required temperature, a second frame which is of similar shape and size as the first frame and which has been also heated to the desired temperature is placed over the foil so that the second frame engages with said marginal edge regions. The two frames are effectively clamped together with a predetermined clamping pressure. The foil and the two frames are then cooled according to a predetermined cooling regime.

In a particular arrangement, the material of the two frames is chosen such that the thermal expansion coefficient of the frames is smaller than or equal to that of the material of the foil. Consequently, because of the different thermal expansion coefficients, the foil will contract more forcefully than the frames during the cooling processes. The tensile forces arising from this differential cooling through the temperature range involved will result in any overall unevenness of the foil being straightened out and in any local surface defects being effectively ironed out, thereby resulting in increased mechanical strength to the treated foil. Depending upon the material to be processed, the intrinsic after-shrinkage capacity, which is referred to as "Compaction Effect" in the case of glass, can also be utilized in the stretching process. By allowing the material, i.e. foil to cool down appropriately slowly, the atoms or molecules will be in a position or able to adopt corresponding positions of equilibrium for the temperature concerned. When the frame and foil have different thermal expansion coefficients, the after shrinkage capacity will reinforce the stretching process.

According to a further manifestation of the process, the foil is cooled down at a faster rate than the cooling rate for the frames. This can be achieved by utilizing frames which are thermally more sluggish, that is, have greater thermal inertia than the foil. The thermal inertia can either be adjusted by the choice of the material used for the frame or frames and/or by appropriate selection of the dimensions of the frames, i.e. by selecting suitable thickness for the frames.

In practice, the clamping effect exerted between the frames is such that while the foil is held in place the foil is able to shift relative to the two frames during cooling before the tensile forces produced reach the tearing limit for the foil material. In order to achieve a sufficient adhesion between the foil and frames, those portions of the frame that are to cooperate with the foil are ground smooth while the corresponding portions of the second frame have a foil support surface which defines the required contours on the foil surface for a uniform surface pressure.

Preferably, when a glass foil is to be treated, a cushioning layer is interposed between the foil and the second frame. This layer can be formed from a felted ceramic fiber material of alumina and silica such as FIBRE-FRAX, a product of Carborundum Corporation.

A particular process involving the concepts of the invention is particularly described with reference to the following example.

A 150 μm float glass foil is placed on a first rectangular frame made from a fire-resistant material with a high content of SiO$_2$ with the dimensions of 40×40 cm and a frame thickness of 3 cm as well as a thermal coefficient of approximately 0/° C. The expansion coefficient of the glass foil is approximately $\alpha = 87 \times 10^{-7}/°$ K.

The foil support surface of the first frame is ground to a plane surface finish and is dusted with boron nitride, to avoid the foil from adhering to it. The first frame and the glass foil placed thereupon are then heated at 3/minute to approximately 620° C. and is kept at that value for 30 minutes. The second frame which is of the same size and made from the same material and which has also been heated to 620° C. is then placed upon the top of the glass foil to overlie the first frame, the foil support surface of this second frame having a layer of 1 mm thick FIBRE-FRAX felt secured to the frame with water glass, whereby when the second frame is placed in position the FIBRE-FRAX cooperates with the foil marginal edges.

In order to achieve a compressive loading upon the marginal edge regions of the foil of approximately 15 g/cm/sq., the second frame is weight loaded by refractory bars of suitable weight.

The foil and the two frames are then cooled down to 500° C. at a controlled cooling rate of less than 5° C./minute. On reaching this temperature, the furnace is switched off to allow free cooling at a rate of, for example, 5/6° C./minute.

It has been found that glass foil when processed as above described had an acceptably small residual Compaction Effect and was of exceptional quality because of a greatly improved surface planeness and with an exceptional quality surface finish.

BRIEF DESCRIPTION OF THE DRAWINGS

Drawings 1 and 2 illustrate profiles, in a very highly magnified form, of a foil which has been treated by the process of the invention and corresponding profiles of a similar foil which has been treated by a process different from that of the invention. Thus in the drawings.

DETAILED DESCRIPTION OF THE DRAWINGS

Figure 1:
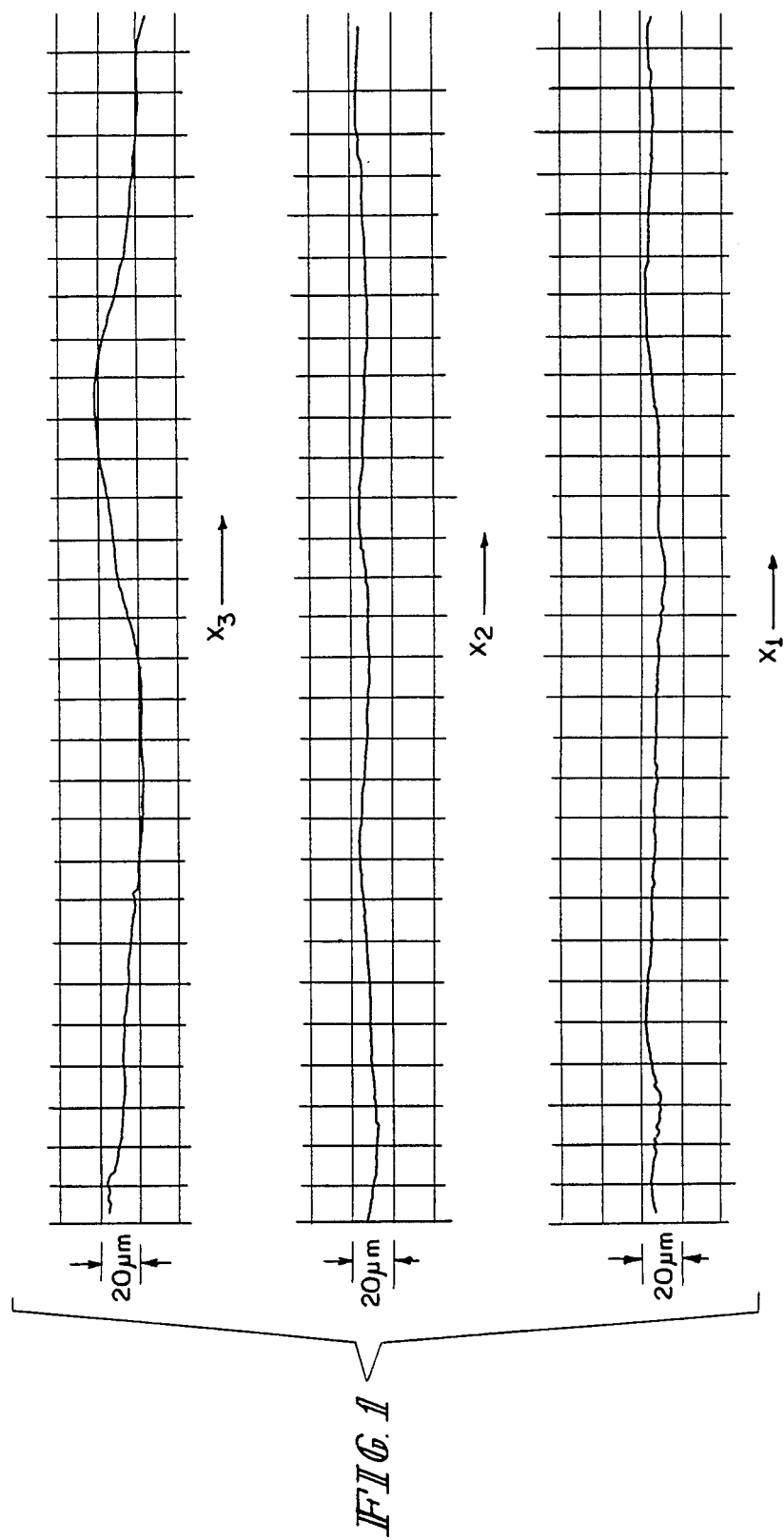
FIG. 1 illustrates results of a planeness profile scan of a glass foil following treatment by the process of the invention, the foil profiles being taken along three parallel scanning paths X1, X2, and X3.
Figure 2:
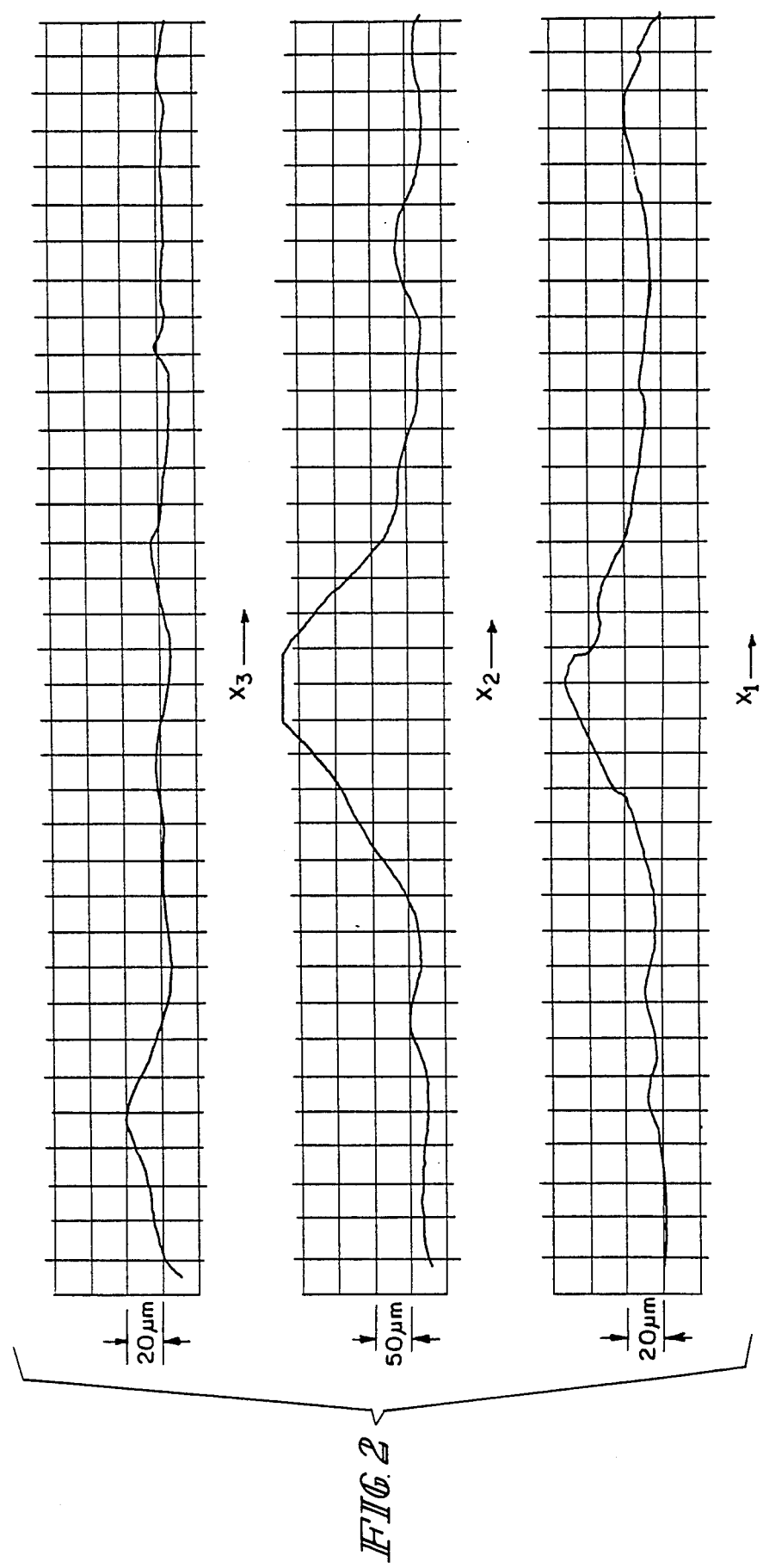
FIG. 2 illustrates corresponding planeness profile scan of an equally thick glass foil made from the same material as was used for the foil of FIG. 1, following a conventional process to press the foil flat, the foil profile being taken along three similar parallel scanning paths X1, X2, and X3.
Figure 3:
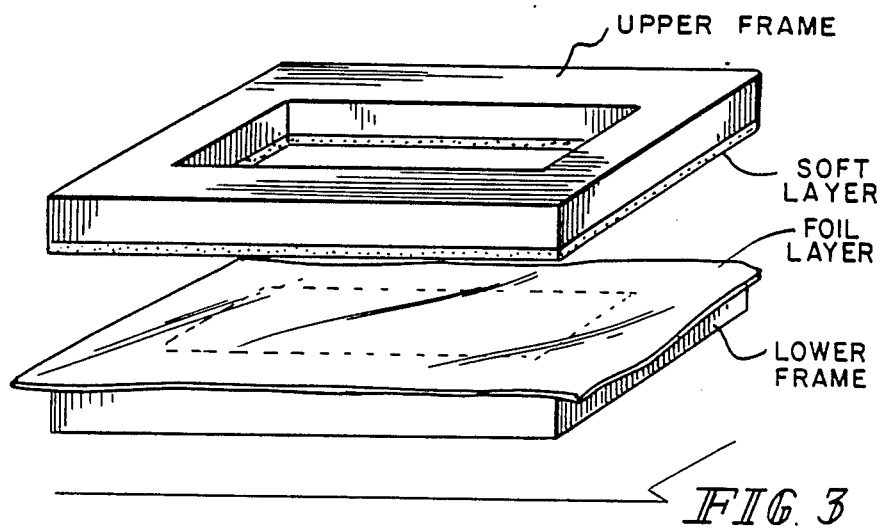
FIG. 3 is a schematic view of the frames and foil prior to the application of the second frame to the foil.

In FIG. 3 and as discussed in the Statement of the Invention, lower frame 12 is shown with foil 10 placed thereon. The upper frame 14 is shown before placement onto the foil 10. As discussed in the Statement of the Invention, the second frame 14 is shown with a cushioning layer 16.

Figure 4:
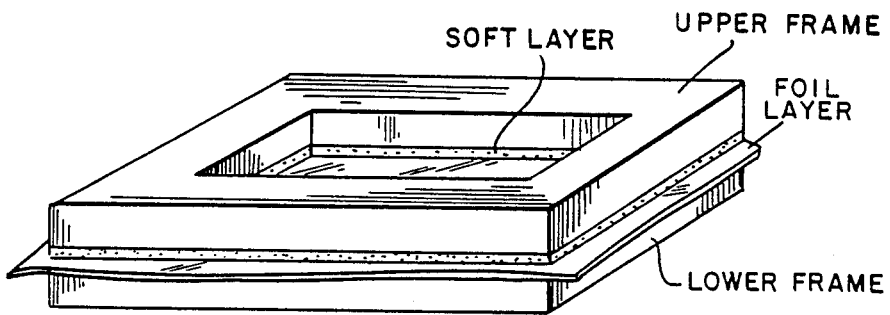
FIG. 4 is a schematic view of the frames and foil after the second frame has been applied to the foil.

As shown in FIG. 4, after the first frame 12 and the foil 10 are heated to the predetermined temperature, the second frame 14 is placed on the foil 10.

While I have shown and described embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed is:

1. A process for improving the surface of a glass foil comprising; placing the foil on a first frame such that the foil is permitted to expand; heating the foil together with the frame at a temperature which lies in the temperature range at which the foil begins to soften without sagging; placing a second frame, which is exactly as large and exactly at the same temperature as the first frame, on the foil to clamp the foil within the first and second frame; then clamping the foil in both frames such that the foil will contract differentially with respect to the frames upon cooling, and then cooling.

2. A process as claimed in claim 1, wherein the placing of the foil on the first frame includes supporting the foil by engagement of marginal regions thereof with the first frame such that the marginal regions of the foil are supported thereby; and wherein the second frame is placed on the foil such that the marginal regions of the foil are effectively clamped between the two frames.

3. A process as claimed in claim 2, wherein the first and second frames are caused to effect a clamping action of just enough pressure on the foil marginal regions such that during the cooling process the foil is able to shift relative to the frames sufficiently to prevent the tension forces developed in the foil from reaching the tearing limit for the foil.

4. A process as claimed in claim 1, wherein the material for the production of the first and second frames has a coefficient of thermal expansion no more than that of the material of the foil.

5. A process as claimed in claim 1, wherein the cooling process is such that the intrinsic shrinkage capacity of the foil utilized in tensioning of the foil.

6. A process as claimed in claim 1, wherein the foil is cooled at a rate faster than the rate at which the frames are cooled.

7. A process as claimed in claim 1, wherein the thermal inertia of the frames is greater than that of the foil.

8. A process as claimed in claim 1, wherein a surface of the first frame that cooperates with the foil has a smooth surface; and a surface of the second frame that cooperates with the foil is such as to present to the foil a surface contour affording uniform surface pressure.

9. A process as claimed in claim 1, including a cushioning layer interposed between the second frame and the foil.

10. A process as claimed in claim 9, wherein the cushioning layer comprises a felted ceramic fiber material.

11. A process for improving the surface of a glass foil comprising: placing the foil on a first frame such that the foil can expand; heating the foil together with the frame at a temperature which lies in the temperature range at which the foil begins to soften without significant sagging; placing a second frame, which is exactly as large and exactly at the same temperature as the first frame, on the foil to clamp the foil within the first and second frame; then clamping the foil in both frames such that the foil will contract differentially with respect to the frames upon cooling, and then cooling.

12. A process as claimed in claim 11, wherein both frames are composed of a material whose coefficient of thermal expansion is no more than the coefficient of the thermal expansion of the foil.

13. A process as claimed in claim 11, wherein the foil is cooled at a rate faster than the rate at which the frames are cooled.

14. A process as claimed in claim 11, wherein the thermal inertia of the frames is greater than that of the foil.

15. A process as claimed in claim 11, wherein the first and second frames are caused to effect a clamping action of just enough pressure on the foil marginal regions such that during the cooling process the foil is able to shift relative to the frames sufficiently to prevent the tension forces developed in the foil from reaching the tearing limit for the foil.

16. A process as claimed in claim 11, wherein a surface of the first frame that cooperates with the foil has a smooth surface; and a surface of the second frame that cooperates with the foil is such as to present to the foil a surface contour affording uniform surface pressure.

17. A process as claimed in claim 11, including a cushioning layer interposed between the second frame and the foil.

18. A process as claimed in claim 17, wherein the cushioning layer comprises a felted ceramic fiber material.

19. A process for improving the surface finish of glass foil including two dimensional stretching of foil including the steps of placing the foil to be treated by engagement of the marginal regions thereof with a first frame such that the foil can expand, heating the foil and frame to a temperature which lies within a temperature range within which the foil commences to soften without significant sagging; placing a second frame, which has been heated to the same temperature as the first frame and foil on the foil, such that the marginal regions of the foil are effectively clamped between the two frames, and then cooling the frames and the foil whereby both frames are composed of a material whose coefficient of thermal expansion is less than the coefficient of the thermal expansion of the foil.

* * * * *

UNITED STATES PATENT AND TRADEMARK OFFICE
CERTIFICATE OF CORRECTION

PATENT NO. : 4,685,950

DATED : August 11, 1987

INVENTOR(S) : Schulze

It is certified that error appears in the above-identified patent and that said Letters Patent is hereby corrected as shown below:

In claim 5, column 4, line 53, insert after "foil" --is--.

Signed and Sealed this

Sixteenth Day of February, 1988

Attest:

DONALD J. QUIGG

*Attesting Officer*  *Commissioner of Patents and Trademarks*